(12) United States Patent
Kim et al.

(10) Patent No.: US 7,936,411 B2
(45) Date of Patent: May 3, 2011

(54) LIGHT GUIDE PLATE, BACKLIGHT ASSEMBLY INCLUDING THE SAME, AND LIQUID CRYSTAL DISPLAY DEVICE INCLUDING THE SAME

(75) Inventors: Hyoung-Joo Kim, Uiwang-si (KR); Jae-Joong Kwon, Suwon-si (KR); Seung-In Baek, Seoul (KR); Sung-Kyu Shim, Seoul (KR); In-Sun Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 221 days.

(21) Appl. No.: 12/156,176

(22) Filed: May 29, 2008

(65) Prior Publication Data

US 2008/0297697 A1    Dec. 4, 2008

(30) Foreign Application Priority Data

May 30, 2007   (KR) .................. 10-2007-0052799

(51) Int. Cl.
G02F 1/1333 (2006.01)
G02F 1/1335 (2006.01)

(52) U.S. Cl. ............. 349/56; 349/61; 349/62; 362/623; 362/626

(58) Field of Classification Search .................... 349/56, 349/65, 61, 62; 362/623, 626
See application file for complete search history.

(56) References Cited

U.S. PATENT DOCUMENTS

| | | | |
|---|---|---|---|
| 5,771,328 A | | 6/1998 | Wortman et al. |
| 5,797,668 A | * | 8/1998 | Kojima et al. ............... 362/618 |
| 2002/0039287 A1 | | 4/2002 | Ohkawa |
| 2004/0105248 A1 | | 6/2004 | Yu et al. |
| 2004/0120139 A1 | | 6/2004 | Kunimochi et al. |
| 2005/0140847 A1 | * | 6/2005 | Jeon ................................ 349/62 |
| 2005/0254771 A1 | | 11/2005 | Yamashita et al. |
| 2006/0002149 A1 | | 1/2006 | Lee et al. |
| 2006/0132670 A1 | * | 6/2006 | Choi et al. .................... 349/62 |
| 2006/0187377 A1 | * | 8/2006 | You et al. ...................... 349/64 |
| 2008/0094552 A1 | * | 4/2008 | Kim et al. .................... 349/113 |
| 2009/0167987 A1 | * | 7/2009 | Kim et al. ..................... 349/65 |

FOREIGN PATENT DOCUMENTS

| | | |
|---|---|---|
| CN | 1782818 A | 6/2006 |
| JP | 10-111413 | 4/1998 |
| KR | 1999-023490 | 3/1999 |
| KR | 2005-0045187 | 5/2005 |
| WO | 9424589 A1 | 10/1994 |
| WO | 9815862 A1 | 4/1998 |
| WO | 2006103803 A1 | 10/2006 |

OTHER PUBLICATIONS

English Language Abstract, Publication No. 10-111413, Apr. 28, 1998, 1 p.
English Language Abstract, Publication No. 1999-023490, Mar. 25, 1999, 1 p.
English Language Abstract, Publication No. 2005-0045187, May 17, 2005, 1 p.
European Search Report dated Sep. 29, 2008.

* cited by examiner

*Primary Examiner* — Brian M. Healy
*Assistant Examiner* — Mary A El-Shammaa
(74) *Attorney, Agent, or Firm* — Innovation Counsel LLP

(57) ABSTRACT

Disclosed herein are a light guide plate, a backlight assembly including the light guide plate, and a liquid crystal display device including the backlight assembly which can uniformly maintain the brightness uniformity and prevent the moiré phenomenon. The light guide plate in accordance with the present disclosure includes: an incident surface, to which light generated from a light source is incident, including a diffusion pattern formed in a round shape; an emitting surface, through which the light is emitted, including a first prism pattern; and an opposite surface, formed opposite to the emitting surface, including a direction change pattern by which the direction of the light is changed toward the emitting surface.

18 Claims, 10 Drawing Sheets

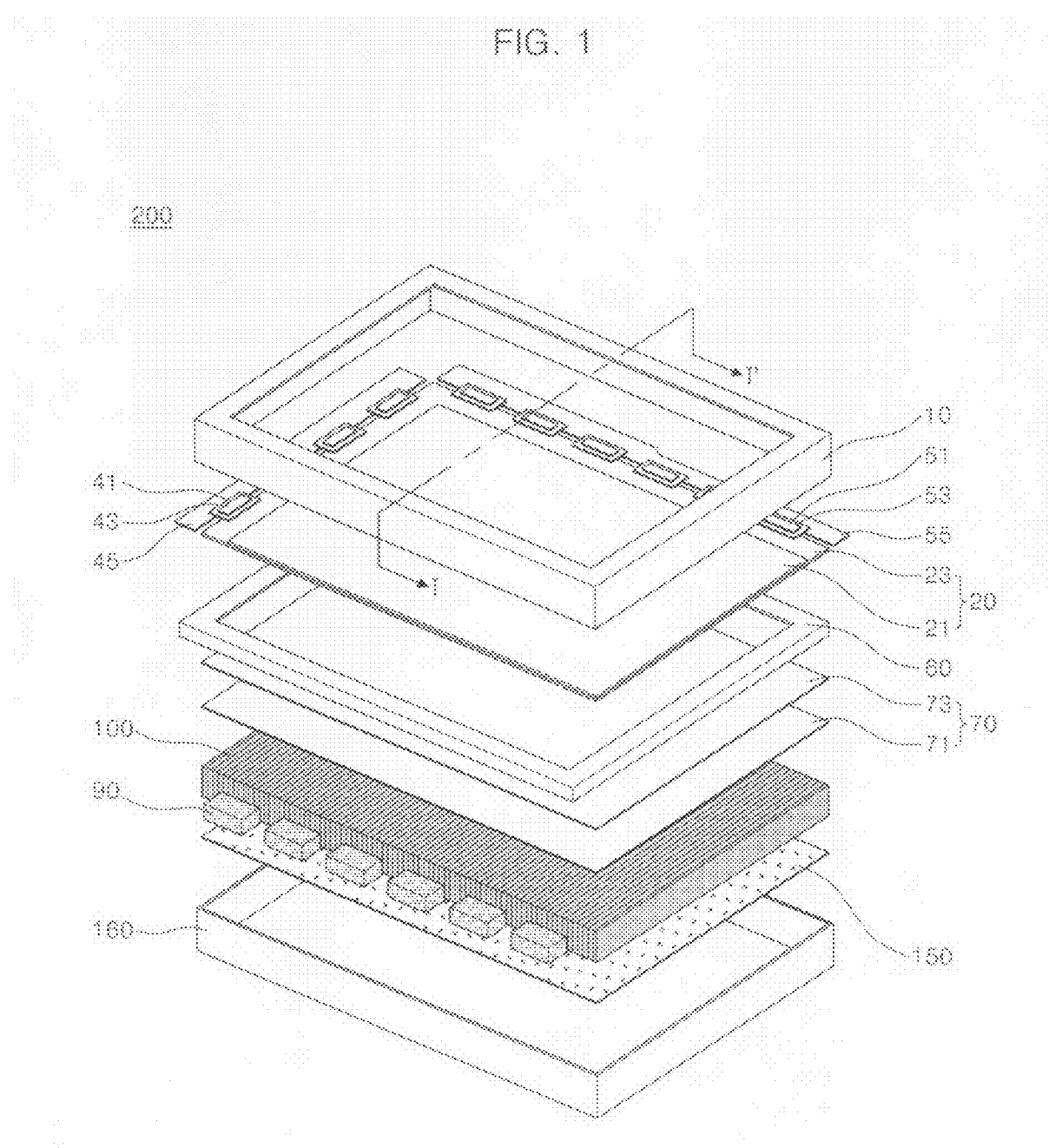

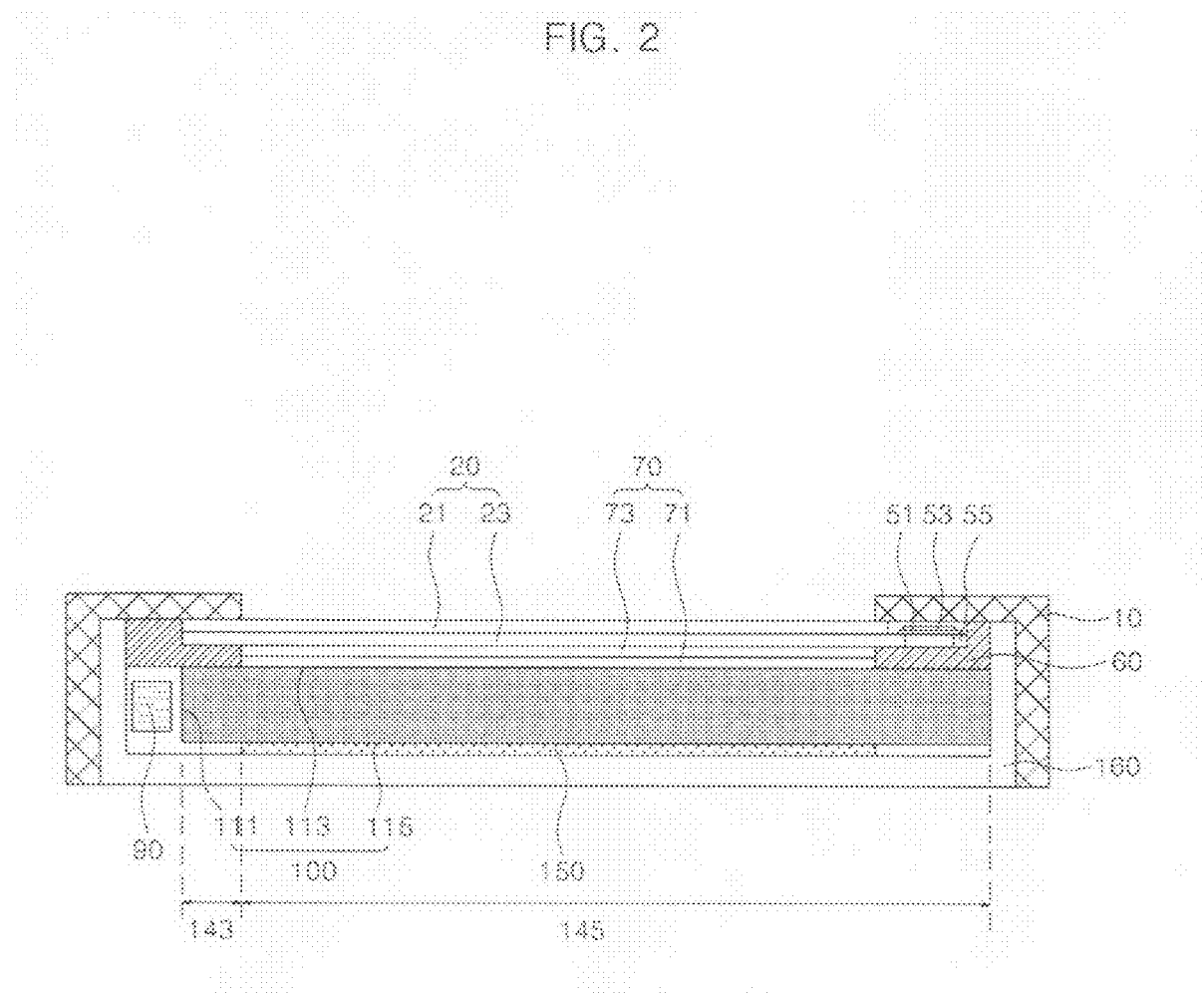

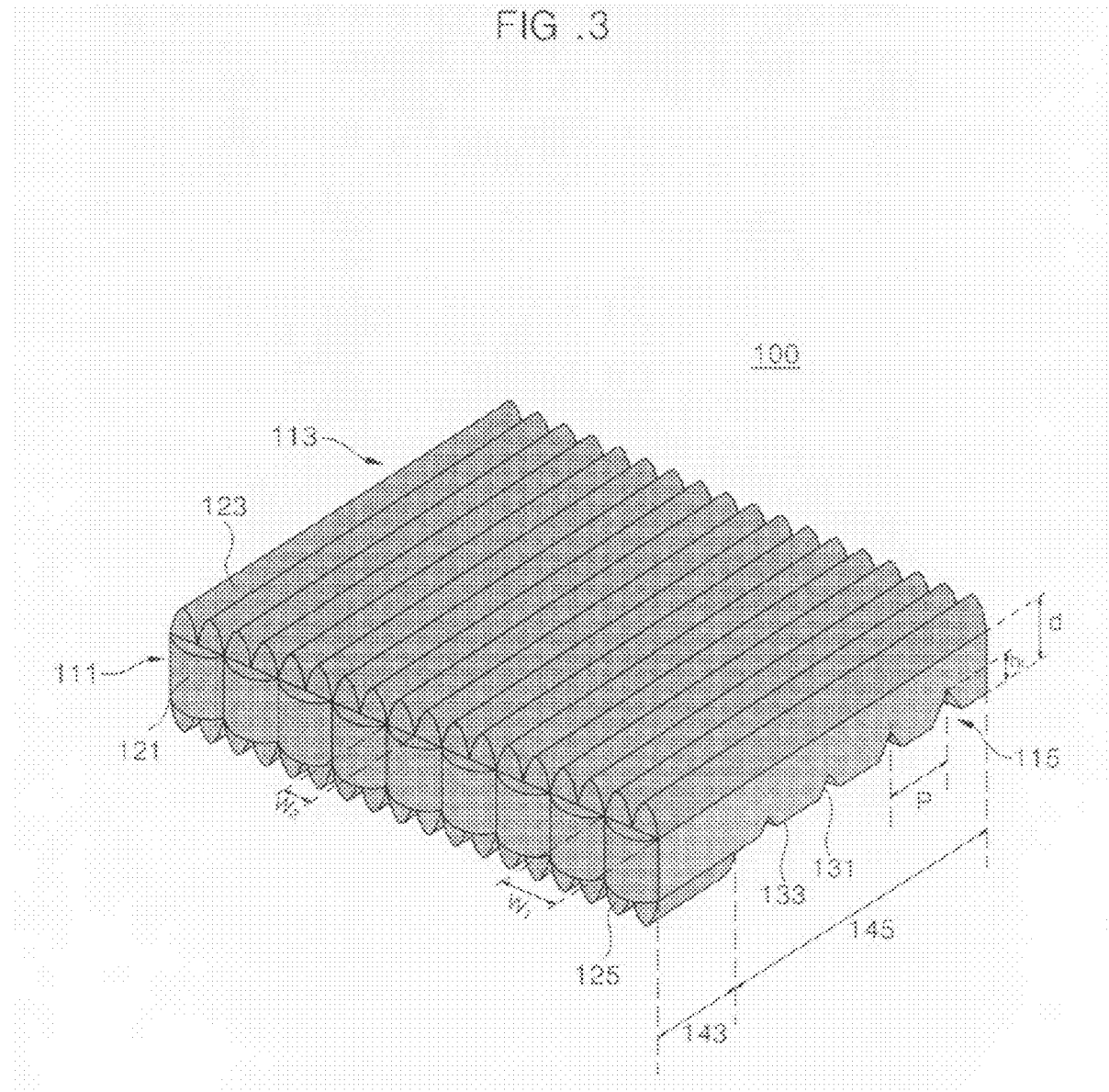

LIGHT GUIDE PLATE, BACKLIGHT ASSEMBLY INCLUDING THE SAME, AND LIQUID CRYSTAL DISPLAY DEVICE INCLUDING THE SAME

CROSS-REFERENCE TO RELATED APPLICATION

This application claims priority to and the benefit of Korean Patent Application No. 10-2007-0052799, filed on May 30, 2007, the disclosure of which is incorporated herein by reference in its entirety.

BACKGROUND OF THE INVENTION

1. Field of the Invention

The present disclosure relates to a liquid crystal display (LCD) device and, more particularly, to a light guide plate, a backlight assembly including the light guide plate, and an LCD device including the backlight assembly.

2. Description of the Related Art

In general, display devices are classified into emissive display devices and non-emissive display devices. The emissive display devices include a cathode ray tube (CRT), an electroluminescent (EL) device, a plasma display panel (PDP), and the like, and the non-emissive display devices include a liquid crystal display (LCD) device, and the like.

The LCD device having various advantages, such as small size, light weight, large screen, high resolution, low driving voltage, and lower power consumption, has been widely used in various industrial fields, such as computer industry, electronic industry, and information technology industry. On the other hand, since the LCD device is a non-emissive display device that receives light from an outside to display an image, it includes a backlight assembly having a light source.

The light sources of the LCD device include a cold cathode fluorescent lamp (CCFL), a light emitting diode (LED), and the like. At present, the CCFL has been most widely used and the use of LEDs is also increasing. Moreover, extensive research aimed at developing the LED has continued to progress to meet the demand for slimness and lightweight of the LCD device. Accordingly, the light guide plate has been developed to have a slim and flat shape in accordance with the thickness of the LED. As the light guide plate is formed to have a slim and flat shape, the light may not be uniformly transmitted to a LCD panel, and thus the brightness uniformity is degraded and the moiré phenomenon may occur.

SUMMARY OF THE INVENTION

Accordingly, the present disclosure provides a light guide plate including a diffusion pattern and a direction change pattern to maintain the brightness uniformity and prevent the moiré phenomenon, a backlight assembly including the light guide plate, and a liquid crystal display device including the backlight assembly.

In accordance with an aspect of the present disclosure, there is provided a light guide plate including: an incident surface, to which light generated from a light source is incident, including a diffusion pattern formed in a round shape; an emitting surface, through which the light is emitted, including a first prism pattern; and an opposite surface, formed opposite to the emitting surface, including a direction change pattern by which the direction of the light is changed toward the emitting surface.

The opposite surface may further include a second prism pattern, formed symmetrically to the first prism pattern, through which the light is diffused.

The direction change pattern may be formed in an intaglio pattern with respect to the opposite surface.

The opposite surface may include a connection portion formed between the direction change patterns.

The connection portion may be inclined at an angle of about 0.1° to about 1.0° with respect to a bottom surface.

The opposite surface may include a ridge pattern formed in a relief pattern with respect to the opposite surface.

The connection portion may be formed spaced apart from the bottom surface by the height of the ridge pattern.

The height of the ridge pattern may be about 0.1 µm to about 1.2 µm.

The first and second prism pattern may be formed in a round shape.

In accordance with another aspect of the present disclosure, there is provided a backlight assembly including: a light guide plate converting light generated from a light source into a surface light source; an optical sheet disposed on the top of the light guide plate; and a reflection sheet disposed at the bottom of the light guide plate, wherein the light guide plate may include: an incident surface, to which the light generated from the light source is incident, including a diffusion pattern formed in a round shape; an emitting surface, through which the light is emitted, including a first prism pattern; and an opposite surface, formed opposite to the emitting surface, including a direction change pattern, by which the direction of the light is changed toward the emitting surface, and a second prism pattern formed symmetrically to the first prism pattern.

The optical sheet may be formed of two sheets. That is, the optical sheet may include a prism sheet for changing the direction of the light and a protective sheet for preventing the prism sheet from being moved freely.

The optical sheet may be formed of one sheet. The optical sheet may be formed in a round shape.

In accordance with another aspect of the present disclosure, there is provided a liquid crystal display device including: a liquid crystal display panel for displaying an image; an optical sheet disposed at the bottom of the liquid crystal display panel; and a light guide plate formed at the bottom of the optical sheet and guiding light incident from a light source toward the liquid crystal display panel, wherein the light guide plate may include: an incident surface, to which the light generated from the light source is incident, including a diffusion pattern formed in a round shape; an emitting surface, through which the light is emitted, including a first prism pattern; and an opposite surface, formed opposite to the emitting surface, including a direction change pattern, by which the direction of the light is changed toward the emitting surface, and a second prism pattern formed symmetrically to the first prism pattern.

BRIEF DESCRIPTION OF THE DRAWINGS

The above and other features of the present disclosure will be described in reference to certain exemplary embodiments thereof with reference to the attached drawings in which:

FIG. 1 is an exploded perspective view of a liquid crystal display device in accordance with an exemplary embodiment of the present disclosure;

FIG. 2 is a cross-sectional view taken along line I-I' of FIG. 1;

FIG. 3 is a perspective view of a light guide plate in accordance with a first embodiment of the present disclosure;

DETAILED DESCRIPTION

Figure 4A:
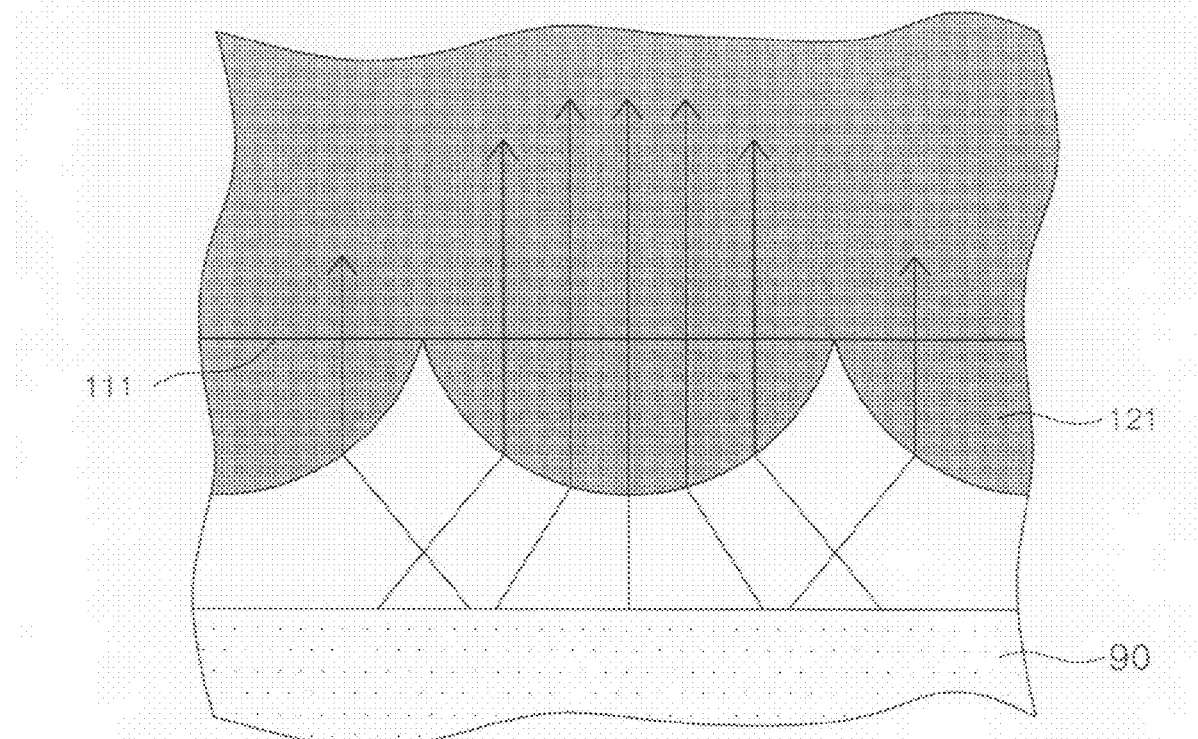
FIGS. 4A to 4D are cross-sectional views illustrating the change in light direction caused by a diffusion pattern, first and second prism patterns, a direction change pattern.

Reference will now be made in detail to embodiments of the present disclosure, examples of which are illustrated in the accompanying drawings, wherein like reference numerals refer to the like elements throughout. The embodiments are described below in order to explain the present disclosure by referring to the figures.

FIG. 1 is an exploded perspective view of a liquid crystal display device in accordance with an exemplary embodiment of the present disclosure, and FIG. 2 is a cross-sectional view taken along line I-I' of FIG. 1.

Referring to FIGS. 1 and 2, the liquid crystal display (LCD) device 200 includes a top chassis 10, an LCD panel 20, a driving circuit, a mold frame 60, a backlight assembly, and a bottom chassis 160.

The top chassis 10 is disposed on the top of the LCD panel 20 to protect the LCD panel 20 and the backlight assembly from an external impact and has an opening formed on the middle thereof to expose a display area of the LCD panel 20.

The LCD panel 20 includes a color filter substrate 21, a thin film transistor (TFT) substrate 23, and a liquid crystal.

The color filter substrate 21 includes a black matrix formed on a lower substrate such as glass or plastic in a matrix shape for preventing a light leakage, and red, green and blue color filters formed in pixel areas defined by the black matrix. Moreover, the color filter substrate 21 includes a common electrode supplying a common voltage to the liquid crystal, and an upper alignment layer formed on the common electrode for liquid crystal alignment.

The TFT substrate 23 includes a data line and a gate line formed on the lower substrate such as glass or plastic with a gate insulating layer disposed therebetween, and a TFT connected to the data line and the gate line. The TFT substrate 23 includes a pixel electrode supplying a pixel voltage to the liquid crystal, and a lower alignment layer formed on the pixel electrode for liquid crystal alignment. The TFT includes a gate electrode connected to the gate line, a source electrode connected to the data line and overlapping a portion of a drain electrode, and the drain electrode facing the source electrode and connected to the pixel electrode.

The driving circuit includes a gate driver integrated circuit (IC) 43 for driving the gate lines of the LCD panel 20, and a data driver IC 53 for driving the data lines of the LCD panel 20. Moreover, the driving circuit includes a timing controller, a power unit, and various circuit elements and generates various signals required to display an image. The timing controller, the power unit, and the various circuit elements are mounted on printed circuit boards (PCBs) 45 and 55.

The various circuit elements mounted on the gate PCB 45 and the data PCB 55 are electrically connected to the gate line and the data line through a gate tape carrier package (TCP) 41 and a data TCP 51.

The mold frame 60 receives the LCD panel 20 and an optical sheet 70 and is formed of a mold material such that an upper surface thereof is opened to receive the LCD panel 20.

The backlight assembly includes the optical sheet 70, a plurality of light emitting diodes (LEDs) 90, a light guide plate 100, and a reflection sheet 150.

The optical sheet 70 disposed on the top of the light guide plate 100 changes the direction of light emitted from the light guide plate 100 toward the LCD panel 20. For this, the optical sheet 70 includes a prism sheet 71 and a protective sheet 73. The prism sheet 71 changes the light incident from the light guide plate 100 to be emitted vertically. The protective sheet 73 is disposed on the prism sheet 71 to protect the optical sheets sensitive to dust or scratches and prevent the optical sheets from being moved freely during the transportation of the backlight assembly. Here, the optical sheet 70 does not require a diffusion sheet since the light is diffused through the light guide plate 100.

The plurality of LEDs 90 mounted on a power board (not shown) at regular intervals is arranged at an incident surface 111 of the light guide plate 100 and supplied with electric power from the outside to generate light.

The light guide plate 100 converts point light sources emitted from the LEDs 90 into a surface light source and transmits the same to the LCD panel 20. The light guide plate 100 includes the incident surface 111 to which the light generated from the LED 90 is incident, an emitting portion 113 through which the incident light is emitted, and an opposite surface 115 opposite to the emitting surface 113. The opposite surface 115 includes an incident area 143 to which light is incident and a change area 145 in which the direction of light is changed.

The reflection sheet 150 reflects the light incident to itself through the opposite surface 115 of the light guide plate 100 back to the light guide plate 100 using a plate having a high reflectivity, thus reducing light loss. To this end, a base material of the reflection sheet 150 is coated with a reflecting member having a high reflectivity.

The bottom chassis 160 receives the backlight assembly and surrounds the edge portion of the backlight assembly. Moreover, the bottom chassis 160 receives the mold frame 60 disposed on the entire surface of the inside of the bottom chassis 160 and the LCD panel 20 placed on the top of the mold frame 60.

Next, the light guide plate shown in FIGS. 1 and 2 will be described in more detail.

FIG. 3 is a perspective view of a light guide plate in accordance with a first embodiment of the present disclosure.

Referring to FIG. 3, the light guide plate 100 may be formed of a transparent polymer material with a thickness d of about 0.5 mm to about 1.5 mm. If the thickness d of the light guide plate 100 is less than 0.5 mm, the light guide plate 100 becomes thin, which makes it difficult to arrange a pattern formation process, thus degrading the brightness uniformity. If the thickness d exceeds 1.5 mm, the light guide plate 100 becomes thick, and thus the slimness of the LCD display is impossible. Accordingly, the light guide plate 100 may be formed with a thickness d of about 0.7 mm to about 1.2 mm to ensure the brightness uniformity and the slimness of the LCD device.

The light guide plate 100 includes the incident surface 111, the emitting surface 113, and the opposite surface 115.

The incident surface 111 to which the light generated from the LED is incident includes a diffusion pattern 121. The diffusion pattern 121 is formed in a round shape and, more particularly, in a relief pattern. Since the light generated from the LED is directly incident to the diffusion pattern 121, the diffusion pattern 121 may have a width W1 of about 100 μm to sufficiently diffuse the light.

The emitting surface 113 includes a first prism pattern 123 formed in a round shape to emit the incident light from the incident surface 111. The first prism pattern 123 is formed in a relief pattern with respect to the emitting surface 113 to emit the light to the LCD panel. The first prism pattern 123 may have a width W2 of about 50 μm. Accordingly, the width W2 of the first prism pattern 123 may be a half of the width W1 of the diffusion pattern 121.

The opposite surface 115 opposite to the emitting surface 113 includes the incident area 143 to which light is incident and the change area 145 in which the direction of light is changed. The incident area 143 includes a second prism pattern 125, and the change area 145 includes a direction change pattern 131 and a connection portion 133.

The second prism pattern 125 is formed in a round shape in the incident area 143. In particular, the second prism pattern 125 is formed symmetrically to the first prism pattern 124 in a relief pattern with respect to the opposite surface 115.

The direction change pattern 131 is formed in the change area 145 and connected to the second prism pattern 125. The direction change pattern 131 is formed in a ridge shape in the direction of the emitting surface 113. The height h1 of the direction change patterns 131 is increased as it goes away from the incident surface 111. The direction change pattern 131 may be formed in a V shape and, for example, in a saw tooth shape, or in a triangular shape. Since the pitch P of the direction change pattern 131 has the same size that of pixels of the LCD panel, it is possible to prevent the moiré phenomenon.

The connection portion 133 is formed between the direction change patterns 131.

FIGS. 4A to 4D are cross-sectional views illustrating the change in light direction caused by the diffusion pattern, the first and second prism patterns, and the direction change patterns.

Referring to FIG. 4A, the light generated from the LED 90 is incident to the light guide plate 100 through the diffusion pattern 121. LED 90, for example, may be a white light LED. In detail, the light generated from the LED 90 is diffused through the diffusion pattern 121 formed on the incident surface 111 to prevent a hot-spot phenomenon, in which the light is concentrated into a spot, and thus the screen of the LCD panel is illuminated in dispersed white light.

Figure 4B:
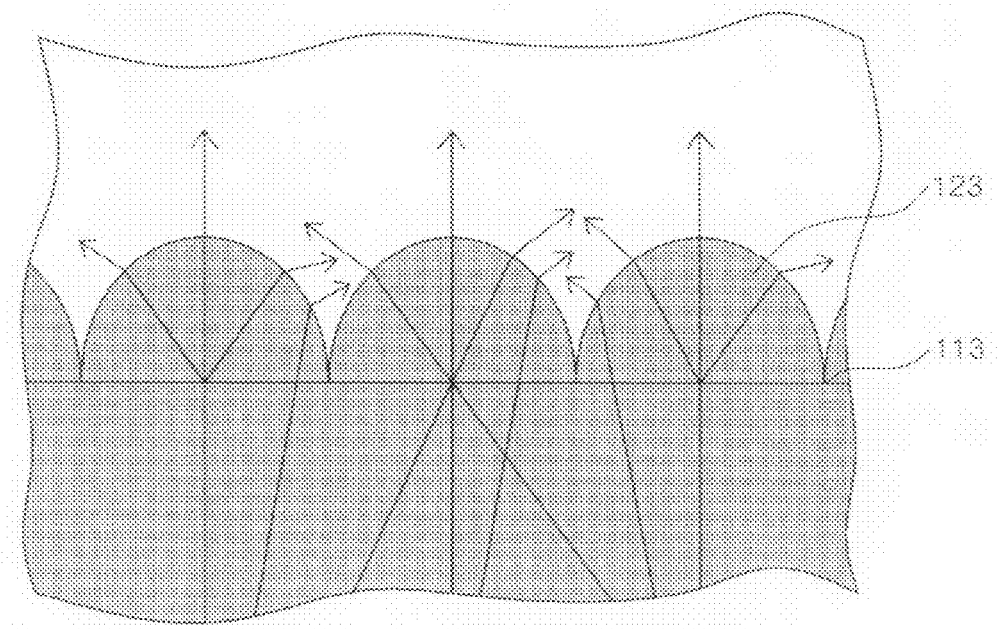

Referring to FIG. 4B, the light incident through the incident surface is emitted through the first prism pattern 123. More specifically, the light incident through the incident surface is diffused through the first prism pattern 123, formed on the emitting surface 113, to uniformly maintain the brightness distribution of the LCD panel.

Figure 4C:
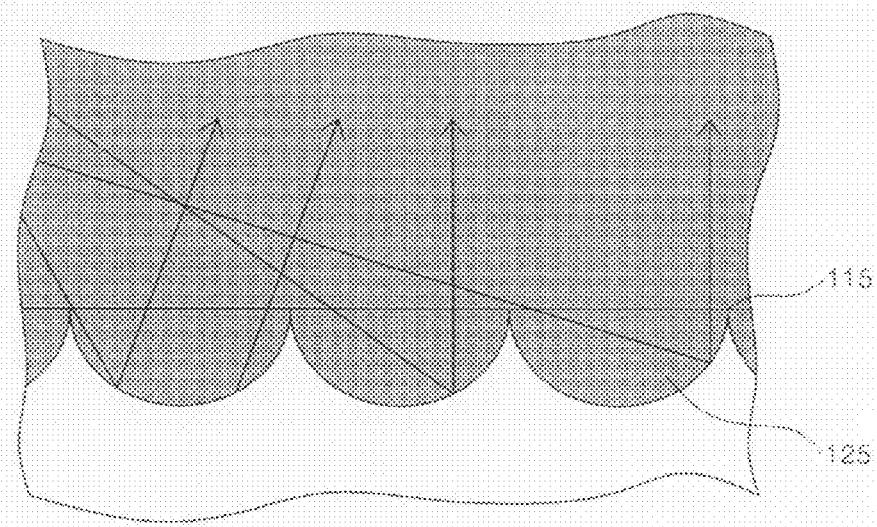

Referring to FIG. 4C, the light incident through the incident surface is diffused through the second prism pattern 125. In detail, the light incident through the incident surface is diffused through the second prism pattern 125, formed on the opposite surface 115, to uniformly maintain the brightness distribution of the LCD panel.

Figure 4D:
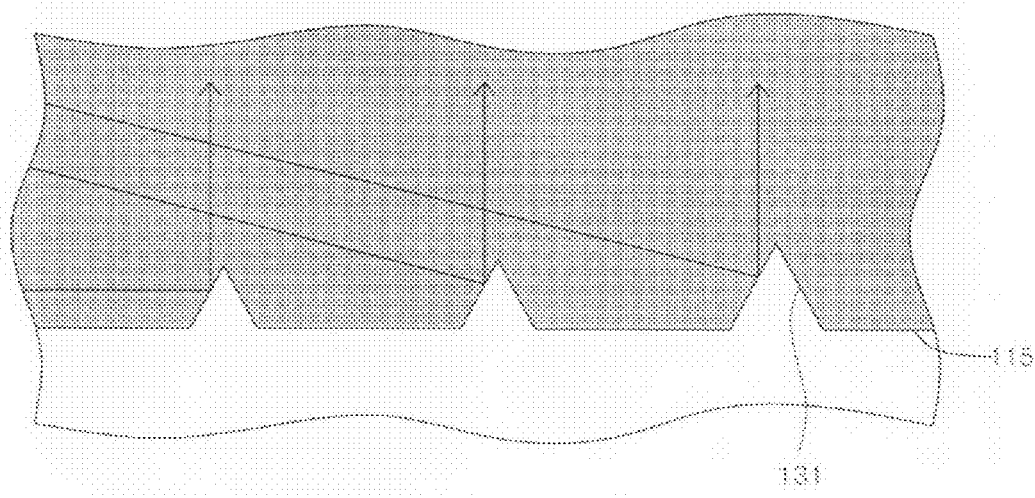

Referring to FIG. 4D, the direction of the light incident through the incident surface is changed by the direction change pattern 131. In detail, the light incident through the incident surface is reflected by a lateral side of the direction change pattern 131, formed on the opposite surface 115, and thus the light direction is changed toward the emitting surface. That is, since the light reflected by the direction change pattern 131 is transmitted toward the LCD panel, it is possible to increase the light efficiency.

Figure 5:
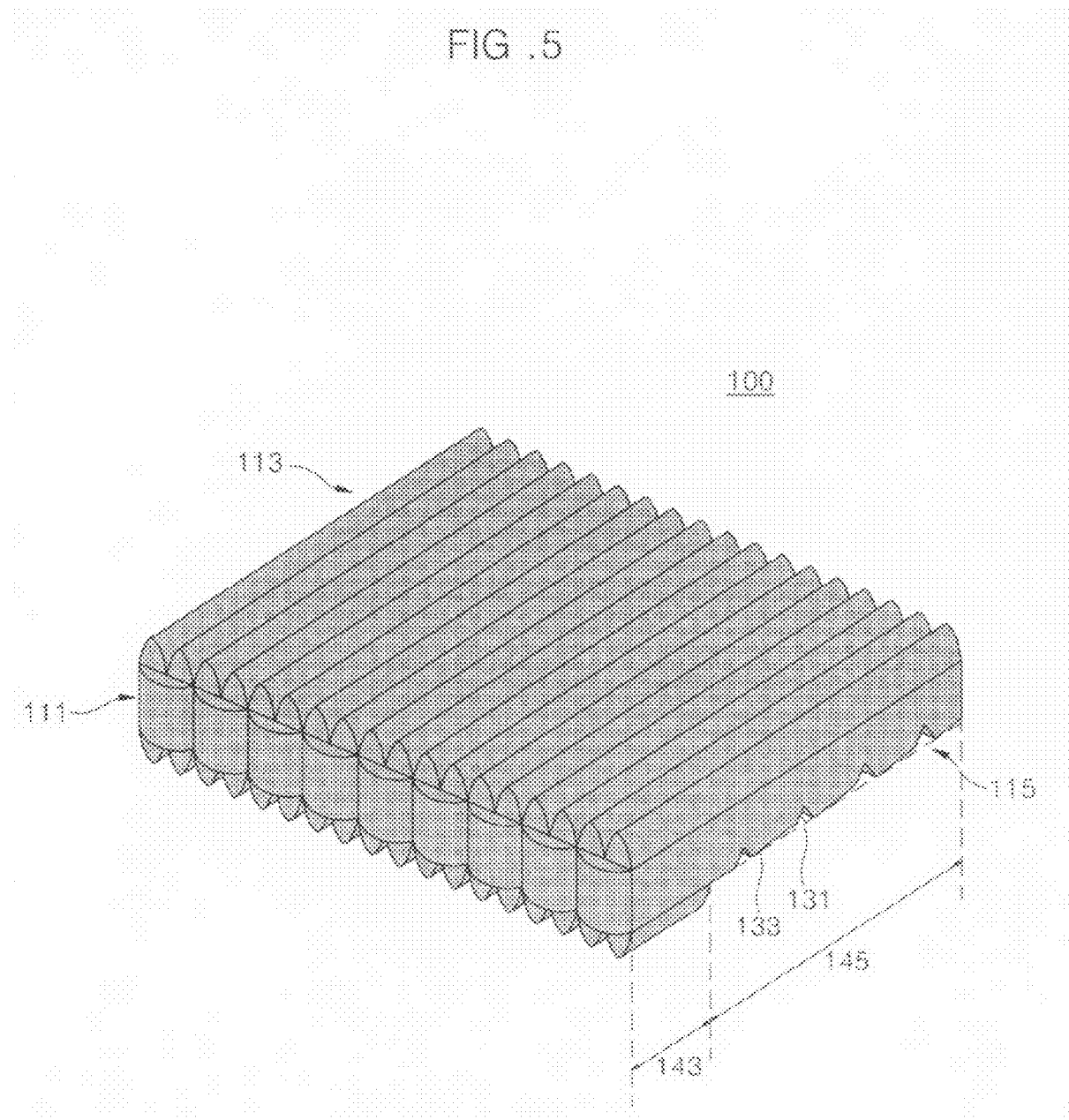
FIG. 5 is a perspective view of a light guide plate in accordance with a second embodiment of the present disclosure.

FIG. 5 is a perspective view of a light guide plate in accordance with a second embodiment of the present disclosure.

Referring to FIG. 5, the light guide plate 100 includes an incident surface 111, an emitting surface 113, and an opposite surface 115 opposite to the emitting surface 113.

The opposite surface 115 includes an incident area 143, to which the light is incident, having a second prism pattern, and a change area 145, by which the light direction is changed, having a direction change pattern 131 and a connection portion 133.

Figure 6:
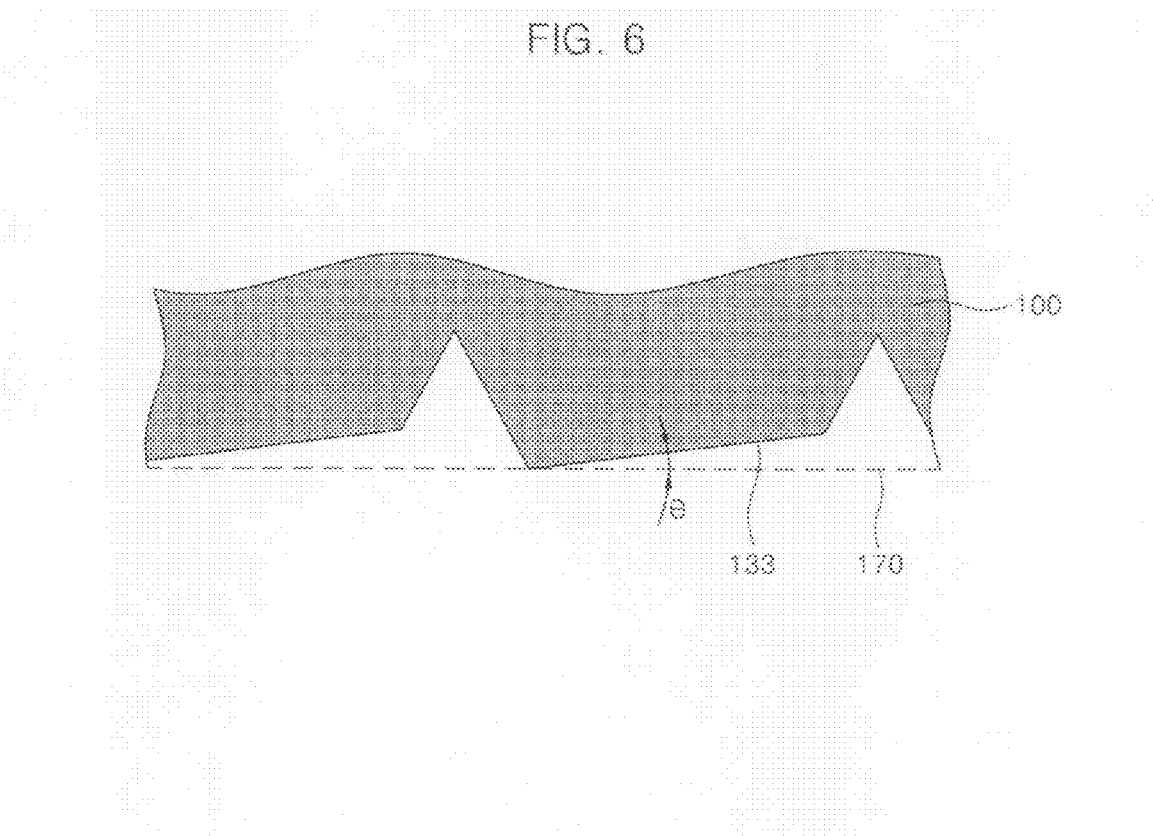
FIG. 6 is an enlarged cross-sectional view of a connection portion of FIG. 5.
Figure 7:
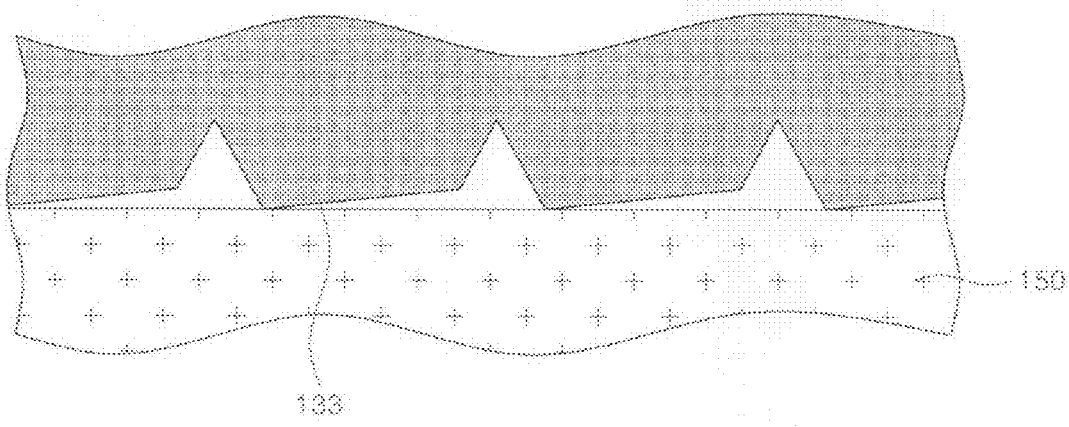
FIG. 7 is an enlarged cross-sectional view of a reflection sheet disposed at the bottom of the light guide plate of FIG. 5.

The connection portion 133 is formed between the direction change patterns 131. As shown in FIG. 6, the connection portion 133 may be inclined at an angle θ, for example, of about 0.1° to about 1.0° with respect to a bottom surface 170. Here, the bottom surface 170 is a virtual surface formed when the reflection sheet is positioned at the bottom of the light guide plate 100. In a case where the connection portion 133 is inclined at an angle θ of less than 0.1°, the connection portion 133 of the light guide plate 100 may be in close contact with the reflection sheet, and thus the light may leak. Whereas, in a case where the angle θ of the connection portion 133 exceeds 1.0°, the light direction may be changed by the connection portion 133 to another direction, i.e., not toward the emitting surface 113, thus degrading the brightness. Accordingly, as shown in FIG. 7, since the connection portion 133 is formed spaced apart from the reflection sheet 150, it is possible to prevent the light leakage.

Since the incident surface 111 and the emitting surface 113 in accordance with the second embodiment of the present disclosure have the same structure and functions as those shown in FIG. 3, a detailed description thereof will be omitted.

Figure 8:
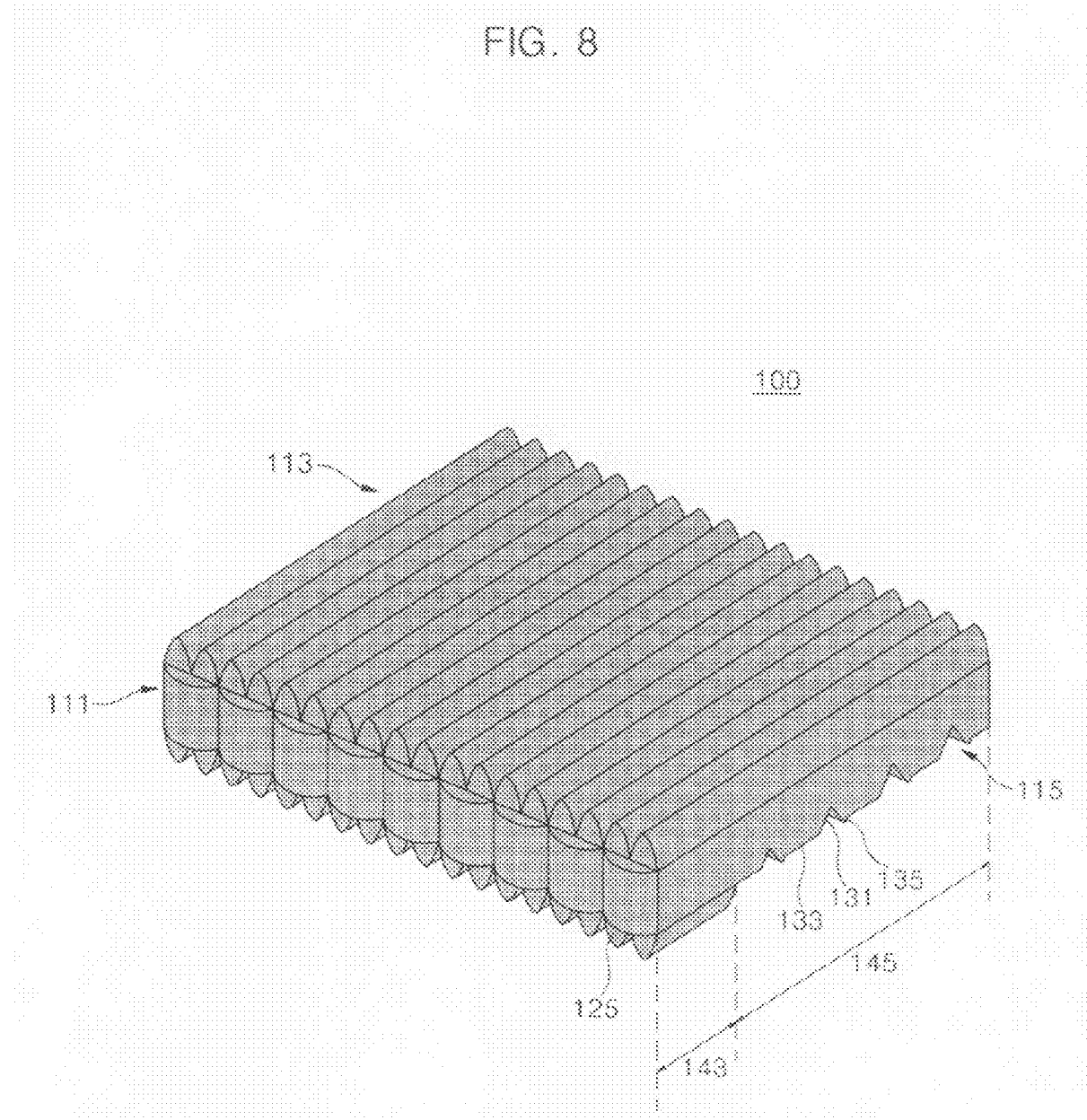
FIG. 8 is a perspective view of a light guide plate in accordance with a third embodiment of the present disclosure.

FIG. 8 is a perspective view of a light guide plate in accordance with a third embodiment of the present disclosure.

Referring to FIG. 8, the light guide plate includes an incident surface 111, an emitting surface 113, and an opposite surface 115 opposite to the emitting surface 113.

The opposite surface 115 includes an incident area 143, to which the light is incident, having a second prism pattern, and a change area 145, by which the light direction is changed, having a direction change pattern 131, a connection portion 133, and a ridge pattern 135.

The ridge pattern 135 is formed in a relief pattern with respect to the opposite surface 115. The ridge pattern 135 is formed in the direction of the reflection sheet. Moreover, the ridge pattern 135 may be formed in a round shape and may be connected to the direction change pattern 131.

Figure 9:
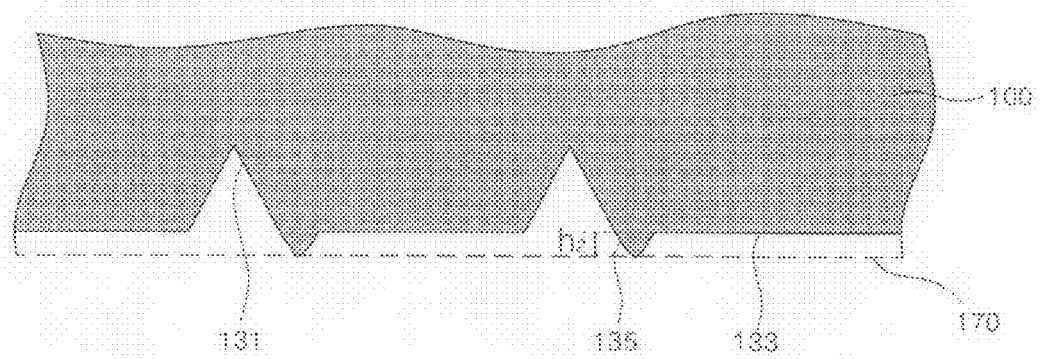
FIG. 9 is an enlarged cross-sectional view of a connection portion of FIG. 8.
Figure 10:
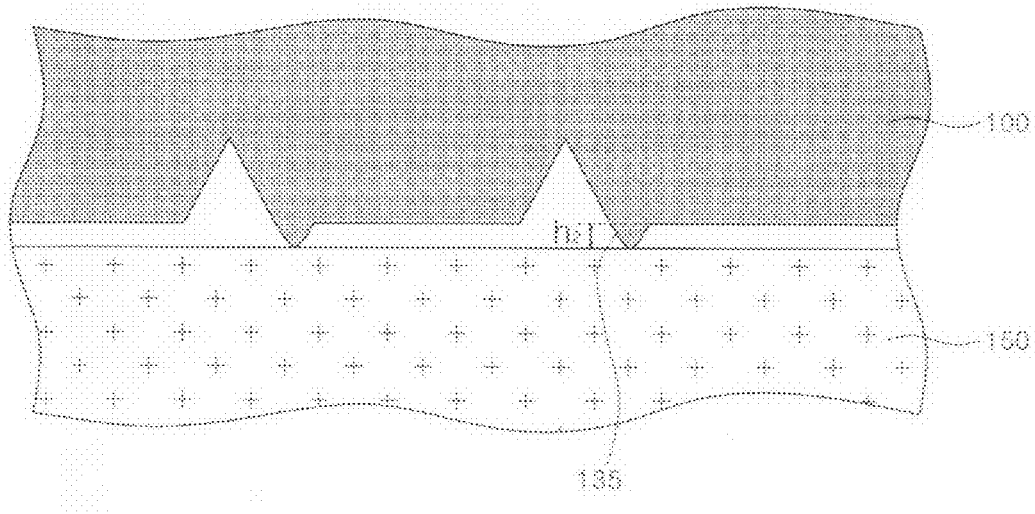
FIG. 10 is an enlarged cross-sectional view of a reflection sheet disposed at the bottom of the light guide plate of FIG. 8.

The connection portion 133 is formed between the direction change patterns 131. As shown in FIG. 9, the connection portion 133 is formed spaced apart from the ridge pattern 135 by the height h2 of the ridge pattern 135 with respect to a bottom surface 170. The height h2 of the ridge pattern 135 may be in the range of about 0.1 μm to about 1.2 μm. Here, the bottom surface 170 is a virtual surface formed when the reflection sheet is positioned at the bottom of the light guide plate 100. In a case where the height h2 of the ridge pattern 135 is less than 0.1 μm, the connection portion 133 of the light guide plate 100 may be in close contact with the reflection sheet, thus causing the hot-spot phenomenon. Whereas, in a case where the height h2 of the ridge pattern 135 exceeds 1.2 μm, the light may not be incident to the reflection sheet, but may be emitted to the outside, thus degrading the brightness. As shown in FIG. 10, since the light guide plate 100 is formed spaced apart from the reflection sheet 150 by the height h2 of the ridge pattern 135, it is possible to prevent the light guide plate 100 from being in contact with the reflection sheet 150, thus reducing the light leakage that can be observed by the naked eye.

Since the incident surface 111, to which the light generated from the LED is incident, and the emitting surface 113, through which the incident light is emitted, in accordance with the third embodiment of the present disclosure have the same structure and functions as those shown in FIG. 3, a detailed description thereof will be omitted.

Figure 11:
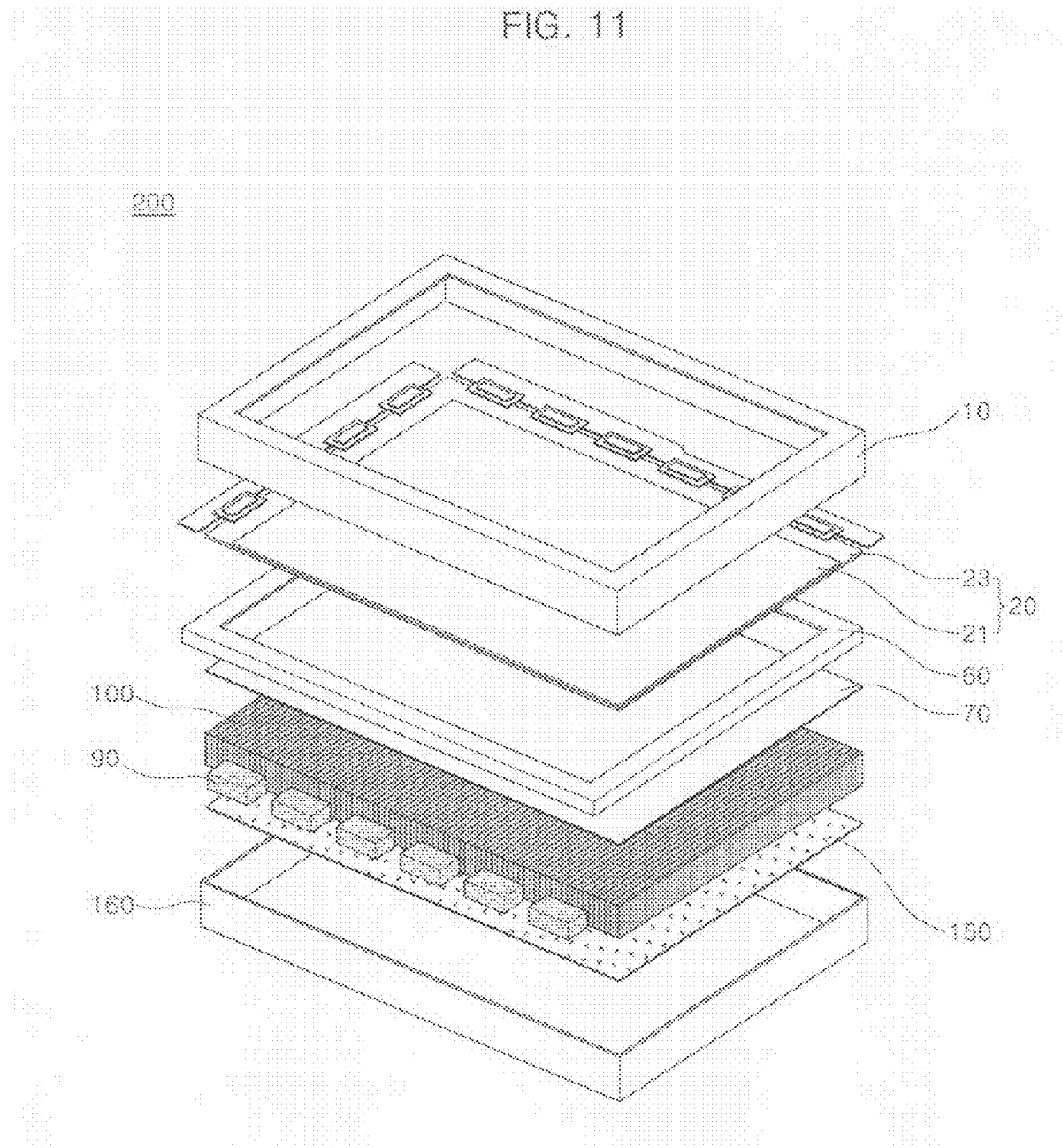
FIG. 11 is an exploded perspective view of a liquid crystal display device in accordance with another exemplary embodiment of the present disclosure.

FIG. 11 is an exploded perspective view of a liquid crystal display device in accordance with another exemplary embodiment of the present disclosure.

Referring to FIG. 11, the LCD device 200 includes a top chassis 10, an LCD panel 20, a driving circuit, a mold frame 60, a backlight assembly, and a bottom chassis 160.

The backlight assembly includes an optical sheet 70, a plurality of light emitting diodes (LEDs) 90, a light guide plate 100, and a reflection sheet 150.

Since the optical sheet 70 disposed on the top of the light guide plate 100 guides the light emitted from the light guide plate 100 to be incident to the LCD panel 20, the light efficiency is increased. The optical sheet 70 diffuses the incident light from the light guide plate 100 to change the light direction into the vertical direction. Moreover, the optical sheet 70 protects the round shape thereof from dust. Since the optical sheet 70 is formed of one sheet, there arises an effect of reducing the manufacturing cost compared with an optical sheet formed of several sheets.

Since the LED 90, the light guide plate 100, and the reflection sheet 150 have the same structure and functions as those shown in FIGS. 1 and 2, a detailed description thereof will be omitted.

The top chassis 10 is disposed on the top of the LCD panel 20 to protect the LCD panel 20 and the backlight assembly from an external impact.

The LCD panel 20 includes a color filter substrate 21 and a TFT substrate 23 and, since it has the same structure as the LCD panel shown in FIGS. 1 and 2, a detailed description thereof will be omitted.

Moreover, the driving circuit is formed to configure the LCD panel 20 and, since it has the same structure as the driving circuit shown in FIGS. 1 and 2, a detailed description thereof will be omitted.

The mold frame 60 and the bottom chassis 160 receive the LCD panel, the driving circuit, and the backlight assembly to protect them from an external impact.

As described above, the present disclosure provides the light guide plate 100 including the diffusion pattern 121, the first and second prism pattern 123 and 125, the direction change pattern 131, and the connection portion 133, the backlight assembly including the light guide plate 100, and the LCD device including the backlight assembly. The diffusion pattern 121 is formed on the incident surface 111 of the light guide plate 100 to prevent the hot-spot phenomenon. The first and second prism pattern 23 and 125 are formed on the emitting surface 113 and the opposite surface 115 opposite to the emitting surface, respectively, diffuse the point light sources incident from the LEDs 90 to uniformly maintain the brightness distribution of the LCD panel 20. The connection portion 133 formed on the opposite surface 115 is spaced apart from the reflection sheet 150 to prevent the light guide plate 100 from being in contact with the reflection sheet 150, thus reducing the light leakage. Moreover, since the pitch of the direction change pattern 131 may be formed with the same size as that of the pixels of the LCD panel 20, it is possible to prevent the moiré phenomenon.

Although the present disclosure has been described with reference to certain exemplary embodiments thereof, it will be understood by those skilled in the art that a variety of modifications and variations may be made without departing from the spirit or scope of the present disclosure defined in the appended claims, and their equivalents.

What is claimed is:

1. A light guide plate comprising:
an incident surface receiving light generated from a light source and including a convex pattern protruding toward the light source;
an emitting surface extending from a first edge of the incident surface, the emitting surface emitting the light therethrough and including a first prism pattern formed thereon; and
an opposite surface extending from a second edge of the incident surface that is across the incident surface from the first edge, the opposite surface facing the emitting surface and including a direction change pattern by which a direction of the light is changed toward the emitting surface, wherein the opposite surface further comprises a second prism pattern which is arranged adjacent to the second end portion of the incident surface and formed symmetrically to the first prism pattern.

2. The light guide plate of claim 1, wherein the direction change pattern is formed in an intaglio pattern with respect to the opposite surface.

3. The light guide plate of claim 2, wherein the direction change pattern is provided in a plural number, and the opposite surface comprises a connection portion formed between the direction change patterns.

4. The light guide plate of claim 3, wherein the connection portion is inclined at an angle of about 0.1° to about 1.0° with respect to an imaginary horizontal plane.

5. The light guide plate of claim 3, wherein the opposite surface comprises a ridge pattern protruding from the connection portion.

6. The light guide plate of claim 5, wherein the connection portion is formed spaced apart from an imaginary horizontal plane by the height of the ridge pattern.

7. The light guide plate of claim 5, wherein the height of the ridge pattern is about 0.1 μm to about 1.2 μm.

8. The light guide plate of claim 1, wherein a cross section of the first and second prism patterns is formed in a round shape.

9. A backlight assembly comprising:
a light source generating light;
a light guide plate receiving the light;
an optical sheet disposed on the top of the light guide plate; and
a reflection sheet disposed at the bottom of the light guide plate,
wherein the light guide plate comprises:
an incident surface receiving the light generated from the light source and including a convex pattern protruding toward the light source;
an emitting surface extending from a first edge of the incident surface, the emitting surface emitting the received light therethrough and including a first prism pattern formed thereon; and
an opposite surface extending from a second edge of the incident surface that is across the incident surface from the first edge, the opposite surface facing the emitting surface and including a direction change pattern by which a direction of the received light is changed toward the emitting surface, and a second prism pattern formed symmetrically to the first prism pattern.

10. The backlight assembly of claim 9, wherein the direction change pattern is provided in a plural number, and the opposite surface comprises a connection portion formed between the direction change patterns.

11. The backlight assembly of claim 10, wherein the connection portion is inclined at an angle of about 0.1° to about 1.0° with respect to an imaginary horizontal plane.

12. The backlight assembly of claim 10, wherein the opposite surface comprises a ridge pattern protruding from the connection portion toward the reflection sheet, and the connection portion is formed spaced apart from an imaginary horizontal plane by the height of the ridge pattern.

13. The backlight assembly of claim 9, wherein the light guide plate is formed with a thickness of about 0.5 mm to about 1.5 mm.

14. The backlight assembly of claim 9, wherein the optical sheet is formed of two sheets.

15. The backlight assembly of claim 14, wherein the two sheets comprise a prism sheet for changing the direction of the light and a protective sheet for preventing the prism sheet from being moved freely.

16. The backlight assembly of claim 9, wherein the optical sheet is formed of one sheet.

17. A liquid crystal display device comprising:
a liquid crystal display panel for displaying an image;
a light source generating light;
a light guide plate guiding the light toward the liquid crystal display panel; and
an optical sheet disposed between the light guide plate and the liquid crystal display panel;
wherein the light guide plate comprises:
an incident surface receiving the light generated from the light source and including a diffusion pattern having a round-shaped cross section;
an emitting surface extending from a first edge of the incident surface, the emitting surface emitting the received light therethrough and including a first prism pattern formed thereon; and
an opposite surface extending from a second edge of the incident surface that is across the incident surface from the first edge, the opposite surface facing the emitting surface and including a direction change pattern by which a direction of the received light is changed toward the emitting surface and a second prism pattern formed symmetrically to the first prism pattern.

18. The liquid crystal display device of claim 17, wherein a pitch of the direction change pattern has a same size as that of pixels of the liquid crystal display panel.

* * * * *